United States Patent
Dielacher et al.

(10) Patent No.: US 10,575,384 B2
(45) Date of Patent: Feb. 25, 2020

(54) ADAPTIVE TRANSMIT LIGHT CONTROL

(71) Applicant: Infineon Technologies AG, Neubiberg (DE)

(72) Inventors: Markus Dielacher, Graz (AT); Martin Flatscher, Graz (AT); Thomas Gigl, Graz (AT); Robert Lobnik, Bad Eisenkappel (AT); Michael Stadler, Graz (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 15/790,520

(22) Filed: Oct. 23, 2017

(65) Prior Publication Data

US 2019/0124748 A1 Apr. 25, 2019

(51) Int. Cl.
| | |
|---|---|
| *H05B 37/00* | (2006.01) |
| *H05B 37/02* | (2006.01) |
| *H05B 33/08* | (2020.01) |
| *G01S 7/484* | (2006.01) |
| *G01S 7/497* | (2006.01) |
| *G01S 17/10* | (2020.01) |
| *G01J 1/42* | (2006.01) |
| *G01S 7/481* | (2006.01) |

(52) U.S. Cl.
CPC ......... *H05B 37/0227* (2013.01); *G01S 7/484* (2013.01); *G01S 7/497* (2013.01); *G01S 17/10* (2013.01); *H05B 33/0851* (2013.01); *G01J 1/42* (2013.01); *G01S 7/481* (2013.01)

(58) Field of Classification Search
CPC ........... H05B 33/0815; H05B 33/0818; H05B 41/2828; H05B 41/3921; H05B 41/3927; H05B 41/28; H05B 41/295; H05B 41/2827; H05B 41/3925; Y02B 20/202
See application file for complete search history.

(56) References Cited

U.S. PATENT DOCUMENTS

| | | | |
|---|---|---|---|
| 9,184,698 B1* | 11/2015 | Wiser | H03L 7/06 |
| 2014/0275850 A1* | 9/2014 | Venkatraman | A61B 5/0002 |
| | | | 600/301 |
| 2014/0312233 A1* | 10/2014 | Mark | G01J 1/46 |
| | | | 250/341.8 |
| 2015/0216016 A1* | 7/2015 | Reed | H05B 37/0218 |
| | | | 315/159 |
| 2017/0209053 A1* | 7/2017 | Pantelopoulos | A61B 5/02125 |
| 2017/0209055 A1* | 7/2017 | Pantelopoulos | A61B 5/02438 |

* cited by examiner

*Primary Examiner* — Minh D A
(74) *Attorney, Agent, or Firm* — Schiff Hardin LLP

(57) ABSTRACT

An apparatus, having a transmitted light power/energy monitor configured to monitor transmitted power/energy of light transmitted by a light source, and a controller configured to determine and control a maximum transmit light time based on the transmitted light power/energy and a transmit light power/energy threshold based on time.

20 Claims, 3 Drawing Sheets

300A maximum allowed output power [W] vs exposure time [s]

300B maximum allowed exposure time [s] vs output power [W]

Step 2: Set exposure time to maximum allowed value

Step 1: Measure output power

400

410 – eye safety limit
420 – trans. light
430 – skin safety limit

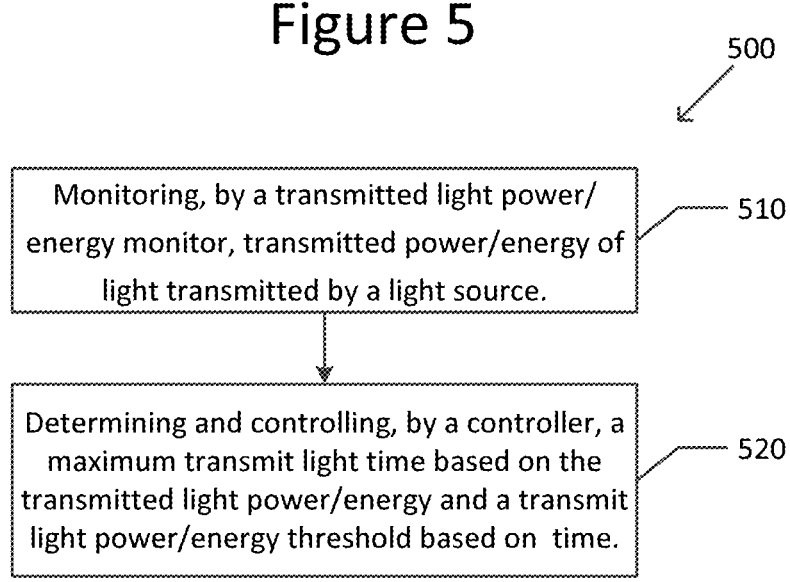

ADAPTIVE TRANSMIT LIGHT CONTROL

BACKGROUND

Time-of-Flight (ToF) distance measurements between a ToF camera and an object are based on active illumination. The distance measurement accuracy is a function of light energy that is transmitted by the ToF camera. However, the maximum light energy is limited by eye and skin safety standards.

Existing solutions allow only a few ToF camera settings which are known to be safe. The exposure time, which is the time during which the ToF camera is transmitting and receiving light, is limited to a predetermined time period which cannot be exceeded. Some advanced modulation schemes allow longer exposure times because the average light energy transmitted by the ToF camera is lower than the maximum permissible value. Additionally, some ToF cameras include a monitoring circuit configured to monitor the transmitted light and shut down the ToF camera when the transmitted light energy exceeds a predetermined value. The performance of the ToF camera is therefore limited.

BRIEF DESCRIPTION OF THE DRAWINGS

FIG. 5 illustrates a flowchart of a method in accordance with an aspect of the disclosure.

DETAILED DESCRIPTION

The present disclosure is directed to an apparatus having a controller configured to determine and control a maximum transmit light time, which is based on transmitted light power/energy of light transmitted by a light source and a transmit light power/energy threshold based on time. This apparatus thereby maximizes measurement accuracy while maintaining eye and skin safety.

Figure 1:
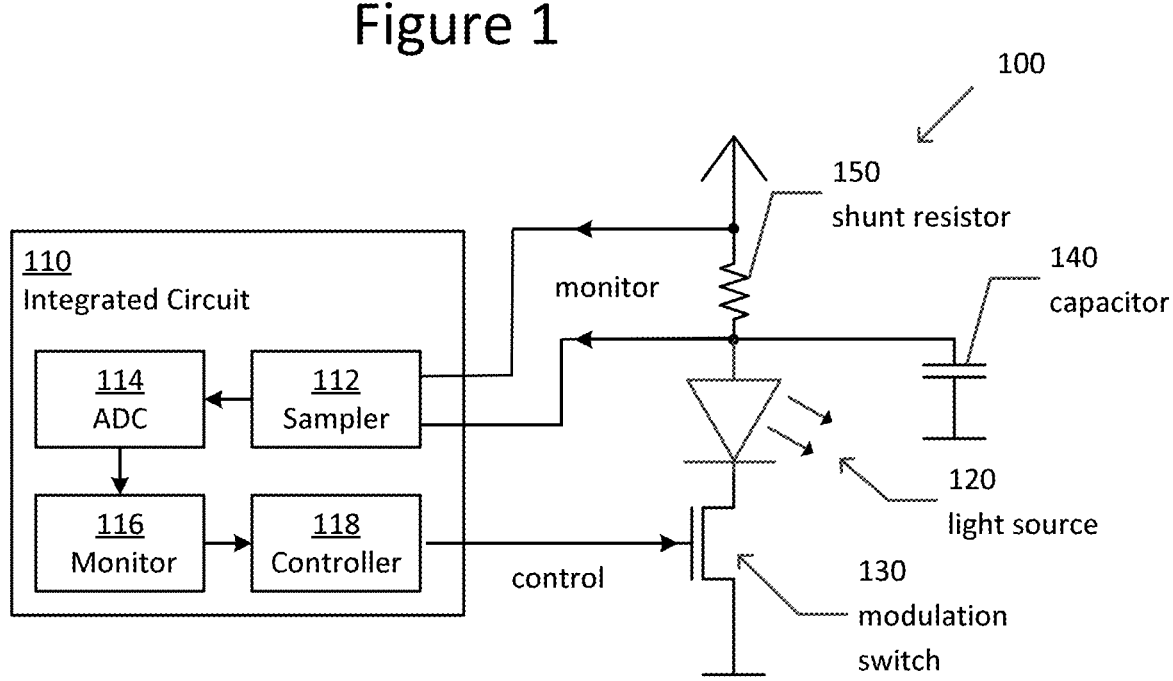
FIG. 1 illustrates a schematic diagram of an apparatus in accordance with an aspect of the disclosure.

FIG. 1 illustrates a schematic diagram of an apparatus 100 in accordance with an aspect of the disclosure.

The apparatus 100 may be a safety circuit of a ToF apparatus. Alternatively, the apparatus 100 may be a safety circuit of a Light Detection and Ranging (LIDAR) apparatus.

The apparatus 100 comprises an integrated circuit 110, a light source 120, a modulation switch 130, a capacitor 140, and a shunt resistor 150.

The light source 120 may comprise a Light Emitting Diode (LED), a laser, and/or any other suitable light source. The modulation switch 130 is configured to modulate the transmitted light by turning the light source 120 on and off based on a received control signal. The capacitor 140 is merely configured to draw any instantaneous current that cannot be supplied by a regulated voltage.

The shunt resistor 150 is configured to measure its voltage drop to determine a current through the light source 120. The current is proportional to the transmit light output power/energy, and will be used to generate the control signal. It is appreciated that the application is not limited to a shunt resistor, but alternatively may include any circuit element that can measure the light source current.

The integrated circuit 110 comprises a sampler 112, an Analog-to-Digital Converter (ADC) 114, a transmitted light power/energy monitor 116, and a controller 118.

The sampler 112 is configured to sample the voltage drop across the shunt resistor 150, which is coupled in series with the light source 120. The ADC 14 is then configured to convert this sampled voltage from analog to digital form.

The transmitted light power/energy monitor 116 determines the current through the light source 120 based on the digitized sampled voltage. The light source current is substantially proportional to transmitted light power/energy. The transmitted light power/energy monitor 116 is configured to monitor transmitted power/energy of light transmitted by the light source 120.

As is known, power is energy divided by time. Throughout the disclosure either or both of these terms may be used, and it is appreciated that when either one of these terms is used, the other may be substituted based on the appropriate conversion.

The controller 118 is configured to determine and control a maximum transmit light time based on the transmitted light power/energy and a transmit light power/energy threshold based on time. The light power/energy transmission is controlled such that the light power/energy transmission is relatively close to but not exceeding the transmit light power/energy threshold based on time, thereby improving performance. The transmit light power/energy threshold based on time may be a safety threshold, such as an eye or skin safety threshold. The threshold may be programmed in advance. The controller 118 may be further configured to scale adaptively the maximum transmit light time to maximize the transmitted light power/energy without exceeding the transmit light power/energy threshold based on time.

The transmitted light power/energy monitor 116 and the controller 118 are shown as separate components. Alternatively, the transmitted light power/energy monitor 116 and the controller 118 may be formed as a single component.

The modulation switch 130 is configured to, based on a control signal from the controller 118, modulate the light source's transmitted light such that the transmitted light power/energy remains less than the maximum transmit light time. The modulation switch 130 comprises a transistor coupled in series with the light source 120 with its base coupled to the controller 118. The transistor may be any transistor (e.g., bipolar transistor, metal-oxide-semiconductor field-effect transistor, etc.), as applicable. The control signal may be a pulse control signal that controls a duty cycle of the light source's transmitted light. More specifically, the average of the sequence of pulses of the control signal may be measured, and the transmit light power/energy threshold may be approached by increasing and/or decreasing the average of the sequence of pulses of the control signal.

The modulation switch 130 may be further configured to, based on the control signal from the controller 118, turn the light source 120 off if the transmitted power/energy exceeds the transmit light power/energy threshold based on time. Conversely, the modulation switch 130 may be further configured to, based on a control signal from the controller 118, turn the light source 120 on if the transmitted energy decreases below the transmit light power/energy threshold.

Rather than merely determining when the transmitted light power/energy exceeds a safety threshold and triggering a shut-down as done previously, the apparatus 100 of this disclosure evaluates transmitted light power/energy over time and pre-calculates a maximum possible exposure time without triggering a shut-down. Performance is increased because the "guardband" between the actual transmitted light power/energy and the safety threshold can be reduced. Measurement accuracy is maximized while maintaining eye and skin safety.

Figure 2:
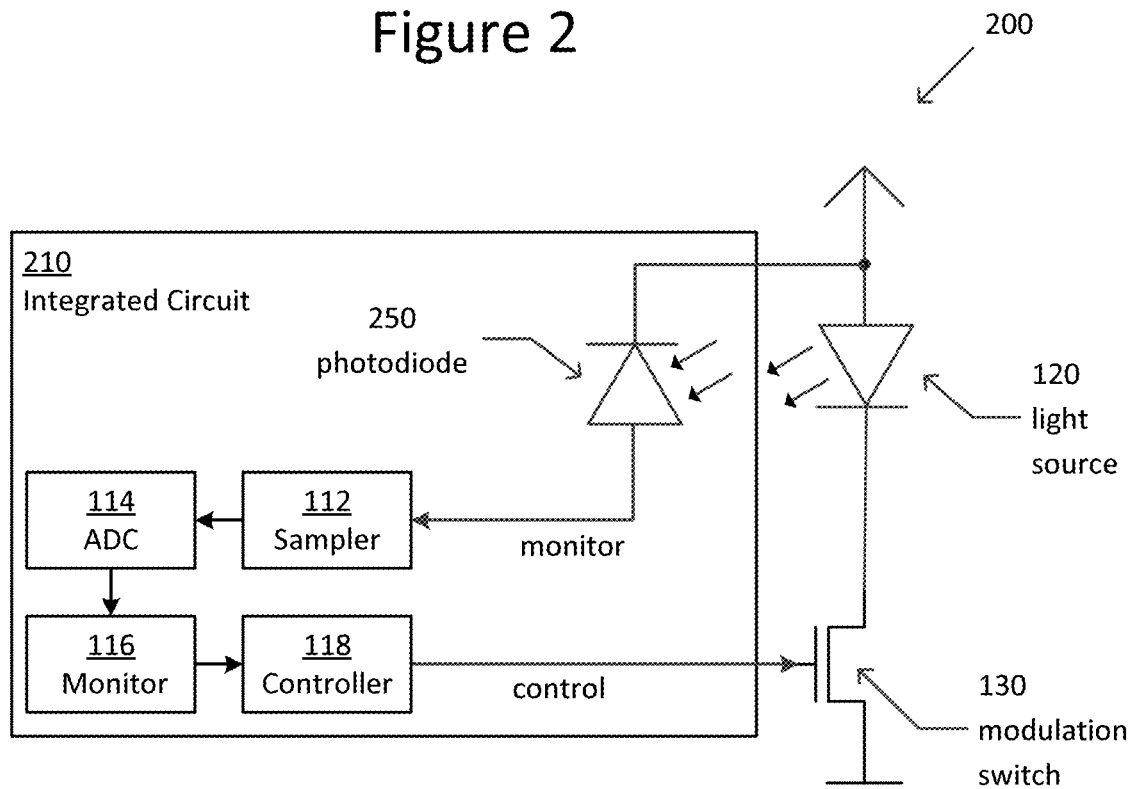
FIG. 2 illustrates a schematic diagram of an apparatus in accordance with another aspect of the disclosure.

FIG. 2 illustrates a schematic diagram of an apparatus 200 in accordance with another aspect of the disclosure.

The apparatus 200 is similar to the apparatus 100 of FIG. 1, except that rather than the light transmitted by the light source 120 being determined by a voltage drop across the shunt resistor 150, transmitted and/or reflected light is measured with a photodiode 250, which is a sensor.

In apparatus 200, the transmitted light power/energy monitor 116 is configured to receive, from the photodiode 250, a measure of the light from the light source 120. The photodiode 250 is located close enough to the light source 120 to obtain an accurate light measurement. The transmitted light power/energy monitor 116 may be configured to receive, via an optical fiber, at least a portion of an optical signal produced by the photodiode 250 based on the measure of the light from the light source 120.

The transmitted light power/energy monitor 116, the controller 118, and the photodiode sensor 250 may be implemented on a single integrated circuit 210. The photodiode 250 is shown as being on the IC 210, but may alternatively be located at another location not on the IC 210.

Figure 3A:
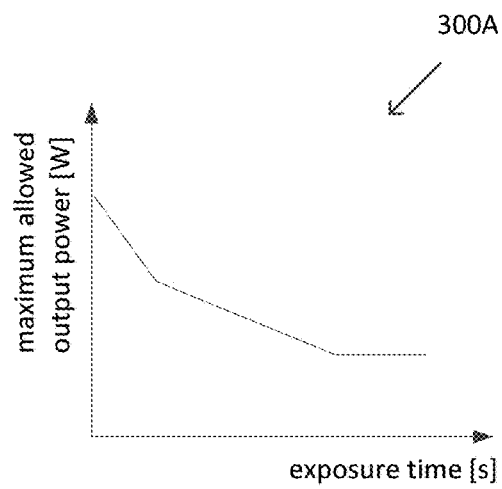
FIG. 3A illustrates a graph of allowed output power versus exposure time.
Figure 3B:
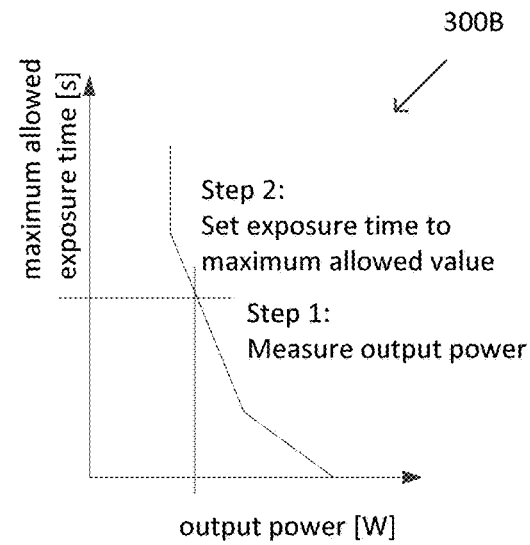
FIG. 3B illustrates a graph of allowed exposure time versus output power.

FIGS. 3A and 3B illustrate graphs 300 of allowed output power and allowed exposure time.

FIG. 3A illustrates a graph 300A of maximum output power versus exposure time. Graph 300A shows how safety standards define the maximum average allowed output power based on the exposure time. If the light source 120 transmits light continuously over time, there is a maximum allowed output power. The longer the light source 120 transmits light, the lower the maximum allowed output power.

FIG. 3B illustrates a graph 300B of maximum exposure time versus output power. Graph 300B shows how the same information as in graph 300A is used to control the exposure time, simply by changing the graph axes. If the output power is lowered, then the light source can transmit light at this output power for a longer period of time. If the light output power is known, the maximum duration may be estimated, that is, how long the light may be transmitted at the known output power without exceeding a safety limit.

Figure 4:
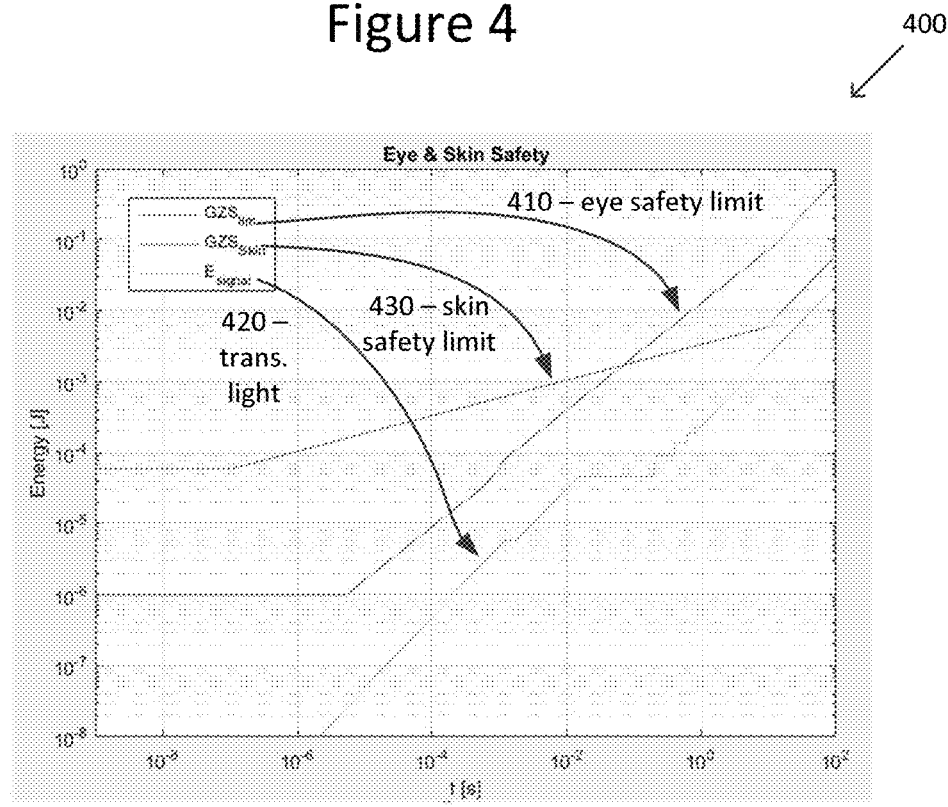
FIG. 4 illustrates a graph of energy versus exposure time showing safety limits.

FIG. 4 illustrates a graph of 400 energy versus exposure time showing safety limits.

Safety regulations limit light power/energy transmitted over time. Line 410 represents an eye safety limit. Line 430 represents a skin safety limit. Line 420 represents actual transmitted light power/energy.

The apparatus 100/200 is configured to prevent the light power/energy transmission from exceeding a safety limit based on time. The light power/energy transmission may be monitored such that the light power/energy transmission is relatively close to but not exceeding the limit, thereby improving performance. If, however, a limit is exceeded, the light source is turned off.

FIG. 5 illustrates a flowchart 500 of a method in accordance with an aspect of the disclosure.

At 510, the transmitted light power/energy monitor 116 monitors transmitted power/energy of light transmitted by the light source.

At 520, the controller 118 determines and controls a maximum transmit light time based on the transmitted light power/energy and a transmit light power/energy threshold based on time.

In accordance with the subject matter of this disclosure, transmitted light power/energy is measures and the exposure time of a ToF camera is set to an acceptable value rather than of limiting use cases to a few pre-calculated values.

Further, cost and size are reduced by integrating functionality on an integrated circuit previously accomplished using external off-chip components. Performance is increased because the "guardband" between the actual transmitted light power/energy and the safety threshold can be reduced. Also, customer design-in efforts are reduced because the customer does not need to address eye and skin safety.

While the foregoing has been described in conjunction with exemplary embodiment, it is understood that the term "exemplary" is merely meant as an example, rather than the best or optimal. Accordingly, the disclosure is intended to cover alternatives, modifications and equivalents, which may be included within the scope of the disclosure.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This disclosure is intended to cover any adaptations or variations of the specific embodiments discussed herein.

What is claimed is:

1. An apparatus, comprising:
    a transmitted light power/energy monitor configured to monitor transmitted power/energy of artificial light transmitted by an artificial light source; and
    a controller configured to determine and control a maximum transmit length of time of the artificial light, wherein the maximum transmit length of time is based on the monitored, transmitted light power/energy and a transmit light power/energy threshold based on time.

2. The apparatus of claim 1, further comprising:
    a modulation switch configured to, based on a control signal from the controller, modulate the transmitted artificial light such that the transmitted light power/energy remains less than an amount that would cause the artificial light transmission to exceed the maximum transmit length of time of the artificial light.

3. The apparatus of claim 2, wherein the modulation switch is a transistor coupled in series with the artificial light source.

4. The apparatus of claim 2, wherein the control signal is a pulse control signal that controls a duty cycle of the transmitted artificial light.

5. The apparatus of claim 1,
    further comprising a sampler configured to sample a voltage across a shunt resistor coupled in series with the artificial light source,
    wherein the transmitted light power/energy monitor is further configured to, based on the sampled voltage, determine a current through the artificial light source, the current through the artificial light source being substantially proportional to transmitted light power/energy.

6. The apparatus of claim 1, wherein the transmitted light power/energy monitor is further configured to receive, from a photodiode, a measure of the artificial light transmitted by the artificial light source.

7. The apparatus of claim 6, wherein the transmitted light power/energy monitor is configured to receive, via an optical fiber, at least a portion of an optical signal produced by the photodiode based on the measure of the artificial light transmitted by the artificial light source.

8. The apparatus of claim 1, further comprising:
a modulation switch configured to, based on a control signal from the controller, turn the artificial light source off if the transmitted power/energy exceeds the transmit light power/energy threshold based on time.

9. The apparatus of claim 8, wherein the modulation switch is further configured to, based on a control signal from the controller, turn the artificial light source on if the transmitted energy decreases below the transmit light power/energy threshold.

10. The apparatus of claim 1, wherein the controller is further configured to scale adaptively the maximum transmit length of time of the artificial light to maximize the transmitted light power/energy without exceeding the transmit light power/energy threshold based on time.

11. The apparatus of claim 10, wherein the transmit light power/energy threshold based on time is a safety threshold.

12. The apparatus of claim 11, wherein the transmit light power/energy threshold based on time is an eye or skin safety threshold.

13. The apparatus of claim 1, wherein the artificial light source is a Light Emitting Diode (LED).

14. The apparatus of claim 1, wherein the artificial light source is a laser.

15. The apparatus of claim 1, wherein the transmitted light power/energy monitor, the controller, and the sensor are implemented on a single integrated circuit.

16. The apparatus of claim 1, wherein the apparatus is a safety circuit of a Time-of Flight (ToF) apparatus.

17. The apparatus of claim 1, wherein the apparatus is a safety circuit of a Light Detection and Ranging (LIDAR) apparatus.

18. The apparatus of claim 1, further comprising:
a modulation switch configured to, based on a control signal from the controller, turn the artificial light source off if the transmitted power/energy exceeds the transmit light power/energy threshold based on time, and turn the artificial light source on if the transmitted energy decreases below the transmit light power/energy threshold.

19. A method, comprising:
monitoring, by a transmitted light power/energy monitor, transmitted power/energy of artificial light transmitted by an artificial light source; and
determining and controlling, by a controller, a maximum transmit length of time of the artificial light, wherein the maximum transmit length of time is based on the monitored transmitted light power/energy and a transmit light power/energy threshold based on time.

20. The method of claim 19, further comprising:
modulating, by a modulation switch, based on a control signal from the controller, the transmitted artificial light such that the transmitted light power/energy remains less than an amount that would cause the artificial light transmission to exceed the maximum transmit length of time of the artificial light.

* * * * *